Patented June 16, 1942

2,286,209

UNITED STATES PATENT OFFICE 2,286,209

PRODUCTION OF MAGNESIUM

Roy C. Kirk, Midland, Mich., assignor to The Dow Chemical Company, Midland, Mich., a corporation of Michigan No Drawing. Application May 31, 1940,
Serial No. 338,095

4 Claims. (Cl. 75—67)

This invention relates to an improved method of preparing magnesium by the thermal reduction of magnesia, using carbon as the reducing agent.

It is established practice to prepare magnesium by heating at a reaction temperature a charge consisting chiefly of a calcined magnesia-containing ore and carbon in a proportion at least equivalent chemically to the magnesia, whereby metallic magnesium is liberated as a vapor, which may be withdrawn and condensed. In commercial operation this process presents a number of disadvantages. Thus the magnesia being reduced, which is usually in powder form, tends to be blown out of the reaction zone along with the magnesium vapor being evolved, thereby reducing the overall yield of magnesium and at the same time necessitating a high-temperature dust-removal step. Moreover, when the process is applied to naturally occurring magnesia-containing ores, a further difficulty arises because of the fact that such ores usually contain oxide impurities, especially lime, silica, and alumina, which remain as a solid residue in the reaction zone after the magnesia and carbon have interacted and volatilized. The occurrence of this residue increases the dust problem mentioned, and also requires that some means be provided for continuously removing the residue from the reaction zone. Unfortunately, the design of a removal system is considerably complicated by the fact that under the conditions in the reaction zone metal mechanical moving parts become seriously weakened within a short time. These disadvantages have considerably limited the use of the process in the commercial production of magnesium.

In the present invention, these difficulties are avoided by heating the magnesia or magnesia-containing ore with carbon at a reduction temperature according to a process in which a molten residue is generated in the reaction zone during the reduction. This residue exerts a washing action on the evolving magnesium vapors and greatly reduces the dust problem mentioned. In addition, when impure magnesia-containing ores are being treated, the impurities tend to enter the molten residue and form a part thereof. Such residual impurities may thus be withdrawn from the reaction zone in liquid form, so that elaborate mechanical means for the removal of residue are unnecessary.

The reduction charge according to one form of the invention essentially comprises, in addition to magnesia and carbon in a proportion at least equivalent chemically thereto, the oxides lime and silica in such proportion that the residue formed on reduction has a fusion temperature below about 1700° C. and a composition substantially within the range (1)

| | Per cent by weight |
|---|---|
| CaO | 10–57 |
| $SiO_2$ | 20–80 |
| Other substances | 0–12 |

In a preferred form of the invention alumina is included with the lime and silica in the afore-mentioned charge, and these ingredients are employed in such proportion that the residue has a fusion temperature below about 1700° C. and a composition substantially within the range (2)

| | Per cent by weight |
|---|---|
| CaO | 10–57 |
| $SiO_2$ | 20–80 |
| $Al_2O_3$ | 0.1–40 |
| Other substances | 0–12 | these constituents being present chiefly in combination with one another as complex silicates. Optimum efficiency is obtained where the ingredients of this latter charge are present in such proportion that the residue has a composition substantially within the narrower range (3)

| | Per cent by weight |
|---|---|
| CaO | 20–57 |
| $SiO_2$ | 38–70 |
| $Al_2O_3$ | 0.1–20 |
| Other substances | 0–12 |

Such residues have fusion temperatures below about 1500° C.

The magnesia employed in the charge may be in substantially pure form, as in calcined magnesite, calcined brucite, or calcined chemically precipitated magnesium hydroxide. More commonly, however, the magnesia is added in the form of calcined dolomite or calcined magnesiferous waste rock of various types, and may contain as impurities very appreciable proportions of lime or silica and a lesser proportion of alumina. The carbon is ordinarily added as graphite, carbon black, coke, coal, etc. The lime, silica, and alumina used in the charge may be in pure form, as ores of these materials, or in combined form, as in silicates and aluminates.

When using substantially pure magnesia in the process, lime and silica, and preferably also alumina, are added to the charge of magnesia and carbon in such proportion that the residue, on reduction, will have a composition within the ranges (1), (2) or (3). In general, to obtain fully the advantages of the invention, these oxide ingredients should be added in a quantity such that the residue represents at least 10 to 20 per cent of the total weight of the charge.

When an impure magnesia-containing ore is employed in the process, one or more of the oxides lime, silica, and alumina may already be present in the ore in a quantity sufficient or nearly sufficient to serve as that oxide ingredient in the charge, a fact easily determined by chemical analysis. In such a case, it is necessary merely to regulate the composition of the charge by adding the proper proportion of such others of the ingredients lime, silica, and alumina as are not already present in the ore in sufficient quantity. In some instances, it may be possible to select a naturally-occurring ore already containing the lime, silica, and alumina in the desired proportions.

In addition to the oxide ingredients discussed, it may sometimes be desirable to add to the charge a small proportion, usually ten per cent or less, of a fluoride flux, such as fluorspar, or a borate, to thin the molten residue formed on reduction. Minor quantities of other materials, such as iron compounds and the rarer elements sometimes present in magnesiferous ores, will also appear in the molten residue, but rarely constitute more than one or two per cent of its composition.

In practice, the calcined magnesia or magnesia-containing ore, carbon, usually in an amount at least equivalent chemically to the magnesia, and such of the oxides lime, silica, and preferably also alumina as are not present in the magnesia-containing material, are mixed in suitable proportions, a hereinbefore explained, and ground to a fine powder. This powdered material may, if desired, be formed into briquettes with the aid of a tar binder; if a briquetting operation is to be carried out, the magnesia-containing ore need not be previously calcined. The charge is then introduced into a suitable vessel and heated at a temperature between about 1400° C. and about 2100° C., depending upon the particular charge employed, under non-oxidizing conditions, as at reduced pressure or in the presence of an inert gas such as hydrogen or helium. At these temperatures the magnesium is liberated as a vapor, which may be withdrawn and condensed to recover the metal. During the reduction, the lime, silica, and alumina combine to form a fluid residue, which serves to prevent dust formation, and may be readily removed from the reaction zone.

In addition to the action already described, the lime, silica, and alumina also appears to exert some catalytic effect upon the process, the reduction of the magnesia being completed in less time than when such oxides are absent.

The following example will illustrate the invention, but is not to be construed as limiting its scope:

Example 1

A reduction mixture was prepared by grinding together 100 parts by weight of calcined dolomite, 64 parts of silica, 30 parts of alumina, and 15 parts of fluospar. The mixture was placed in a graphite container and heated at a reaction temperature below 1500° C. for 40 minutes at an absolute pressure of 0.2–0.5 inch of mercury, the treatment being carried out in an evacuated furnace provided with a magnesium condenser and sight glasses. Evolution of magnesium was substantially complete within 20 minutes. The charge remained solid during the first part of the reaction, but soon formed a fluid residue having a fusion temperature of about 1350° C. and a composition approximately of

| | Per cent by weight |
|---|---|
| CaO | 35 |
| $SiO_2$ | 38 |
| $Al_2O_3$ | 18 |
| Other substances (mostly fluorspar) | 9 |

It is to be understood that the foregoing description is illustrative rather than strictly limitative, and that the invention is co-extensive in scope with the following claims.

I claim:

1. In a process for the production of metallic magnesium wherein a magnesia-containing ore comprising silica as an impurity is heated at a reduction temperature with carbon in a proportion at least equivalent chemically to the magnesia, whereby magnesium is liberated as a vapor, the improvement which comprises regulating the composition of the reduction charge by adding thereto at least one of the oxides lime and silica in such proportion that the residue formed on reduction has a fusion temperature below 1700° C. and a composition substantially within the range

| | Per cent by weight |
|---|---|
| CaO | 10–57 |
| $SiO_2$ | 20–80 |
| Other substances | 0–12 |

2. In a process for the production of metallic magnesium whereby a magnesia-containing ore comprising as impurity at least one of the oxides silica and alumina is heated at a reduction temperature with carbon in a proportion at least equivalent chemically to the magnesia, whereby magnesium is liberated as a vapor, the improvement which comprises regulating the composition of the reduction charge by adding thereto at least one of the oxides lime, silica, and alumina in such proportion that the residue formed on reduction has a fusion temperature below 1700° C. and a composition substantially within the range

| | Per cent by weight |
|---|---|
| CaO | 10–57 |
| $SiO_2$ | 20–80 |
| $Al_2O_3$ | 0.1–40 |
| Other substances | 0–12 |

3. A process according to claim 2 wherein the ingredients of the charge are employed in such proportion that the residue formed on reduction has a fusion temperature below about 1500° C. and a composition substantially within the range

| | Per cent by weight |
|---|---|
| CaO | 20–57 |
| $SiO_2$ | 38–70 |
| $Al_2O_3$ | 0.1–20 |
| Other substances | 0–12 |

4. In a process for the production of metallic magnesium wherein calcined dolomite comprising as impurity at least one of the oxides silica and alumina is heated at a reduction temperature with carbon in a proportion at least equivalent chemically to the magnesia, whereby magnesium is liberated as a vapor, the improvement which comprises regulating the composition of the reduction charge by adding thereto at least one of the oxides silica and alumina in such proportion that the residue formed on reduction has a fusion temperature below 1700° C. and a composition substantially within the range

| | Per cent by weight |
|---|---|
| CaO | 10–57 |
| $SiO_2$ | 20–80 |
| $Al_2O_3$ | 0.1–40 |
| Other substances | 0–12 |

ROY C. KIRK.